(12) United States Patent
Nehls et al.

(10) Patent No.: US 9,038,760 B1
(45) Date of Patent: May 26, 2015

(54) ACTIVE FRONT STEERING SYSTEM LOCK

(71) Applicant: Ford Global Technologies, LLC, Dearborn, MI (US)

(72) Inventors: Oliver Nehls, Canton, MI (US); Jeremy Alan Rawlings, Canton, MI (US); Joshua Guerra, Beverly Hills, MI (US); Lodewijk Wijffels, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 14/077,600

(22) Filed: Nov. 12, 2013

(51) Int. Cl.
*B60R 25/0215* (2013.01)
*B62D 5/00* (2006.01)

(52) U.S. Cl.
CPC .......... *B60R 25/02156* (2013.01); *B62D 5/008* (2013.01)

(58) Field of Classification Search
CPC .. B60R 25/02156; B62D 5/008; B60K 20/06; Y10T 74/2025; Y10T 74/20238
See application file for complete search history.

(56) References Cited

U.S. PATENT DOCUMENTS

| 4,659,969 | A | 4/1987 | Stupak, Jr. | |
| 4,981,048 | A * | 1/1991 | Kobayashi et al. | 74/483 R |
| 5,467,244 | A | 11/1995 | Jayawant et al. | |
| 8,122,963 | B2 | 2/2012 | Davis | |
| 2006/0049621 | A1 * | 3/2006 | Lee | 280/777 |
| 2006/0234537 | A1 * | 10/2006 | Sugitani | 439/164 |

* cited by examiner

*Primary Examiner* — Faye M Fleming
(74) *Attorney, Agent, or Firm* — Raymond L. Coppiellie; Bejin Bieneman PLC

(57) ABSTRACT

A vehicle including an active front steer system including a locking mechanism having a solenoid actuated locking pin and a spring for biasing the pin toward an extended or locked position for engaging a locking disc of the active front steer system wherein the active front steer system further includes a current sensor for sensing the motion of the pin of the solenoid when the engine of the vehicle is shut down and pulse width modulated current to the solenoid is reduced and when the pin movement is sensed, the pulse width modulated current is increased (fed forward duty cycle) to reduce the movement of the pin to reduce the noise made when the metal pin makes when contacting the metal locking disc. The end of the pin and/or the locking disc may also include an insulating material to further reduce any remaining noise made when the metal pin makes when contacting the metal locking disc.

6 Claims, 3 Drawing Sheets

ACTIVE FRONT STEERING SYSTEM LOCK

BACKGROUND

It is generally known to provide a vehicle including an active front steering system and including a solenoid for locking the front steering system. It is also generally known to provide a vehicle including a locking solenoid of an active front steering system that makes an objectionable "click" noise every time the vehicle is shut down. The active front steering (AFS) system may add and subtract angle between the driver steering wheel input and the steering gear input shaft. The active front steering system consists of an electronic control unit (ECU), a motor, a gear and a locking device all integrated into the steering wheel. The locking unit may provide a mechanical connection between the steering wheel and wheels during power-off of the AFS system (i.e., before and/or after shutting down the engine) and it may provide a means to lock the actuator in case of a severe failure in the AFS system. The locking unit may include a solenoid attached to the steering wheel armature, a pin having a spring for biasing the pin in a direction toward a locked position and a locking disc connected to the motor shaft, the disc including pockets or spaces for receiving the end of the pin and for locking the AFS system.

The active front steering (AFS) system can add and subtract angle between the driver steering wheel input and the steering gear input shaft. In one known embodiment, the AFS system consists of an electronic control unit (ECU), a motor, a gear and a locking device all integrated into the steering wheel. The locking unit may provide a mechanical connection between the steering wheel and the wheels of the vehicle during power-off of the system (i.e., after shutting down of the engine). The locking unit may also provide a lock of the AFS system in case of a severe failure in the AFS system or some other input.

While it is known to use a solenoid and locking pin as a lock actuator for an AFS system, it generates objectionable noise when contacting the locking disc. When the current is removed from the solenoid coil, the solenoid pin begins to accelerate from the force of the coil spring of the solenoid which biases the locking pin toward the locked position. When the moving solenoid pin makes contact with the lock plate, an objectionable "click" noise or sound is produced. In one known application, the locking solenoid of the active front steering system makes a noise every time the vehicle is shut down. Despite this long known problem with such systems, there remains a very significant need for an effective solution to eliminate the noise of such systems and yet be operable in the unique operating environment of the AFS system.

DRAWINGS

DETAILED DESCRIPTION

To meet certain customer, industry and regulatory requirements for passenger vehicles, automotive manufacturers are challenged to design vehicles using understood and predictable methods and materials. In one exemplary embodiment of the present disclosure, there is disclosed a vehicle 1 including an active front steering (AFS) system 200. The vehicle may further include a steering wheel 21 and a steering column 22 for adjusting the direction of the front wheels of the vehicle 1. The AFS system 200 can add and subtract angle between the operator's input to the driver steering wheel 21 and the steering column 22 to provide various affects to driving.

Figure 1:
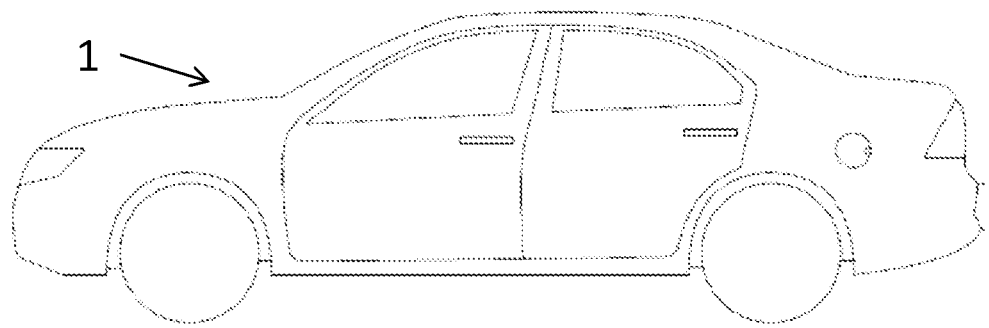
FIG. 1 is a graphic view of a vehicle including an active front steering (AFS) system including a quiet operating AFS lock according to an exemplary embodiment of the present disclosure.
Figure 2:
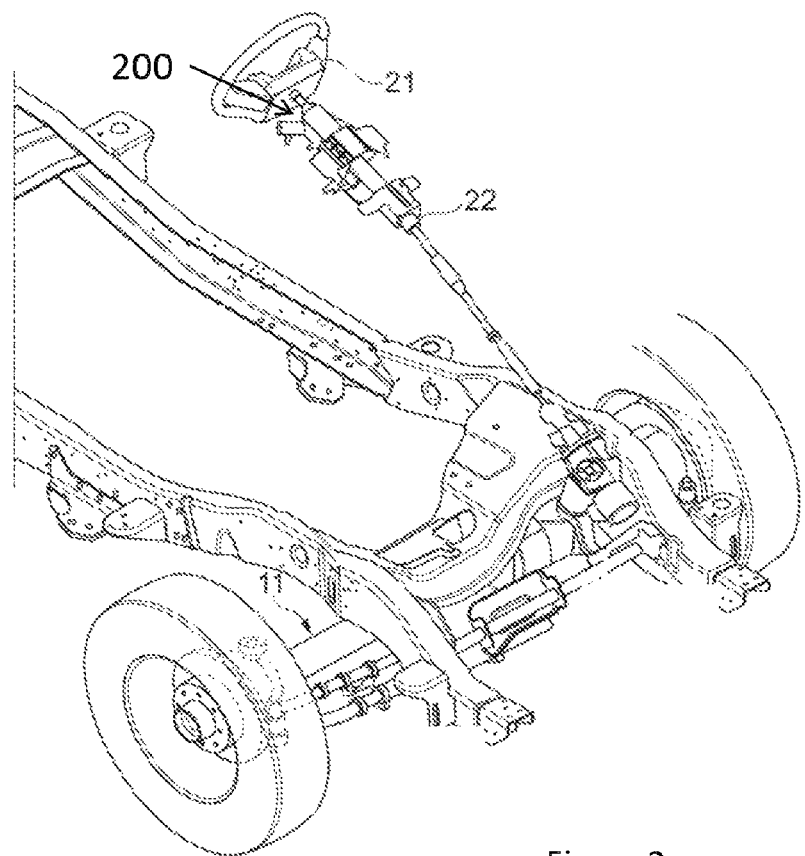
FIG. 2 is a partial, perspective graphic view of the AFS system components of the vehicle of FIG. 1.
Figure 3:
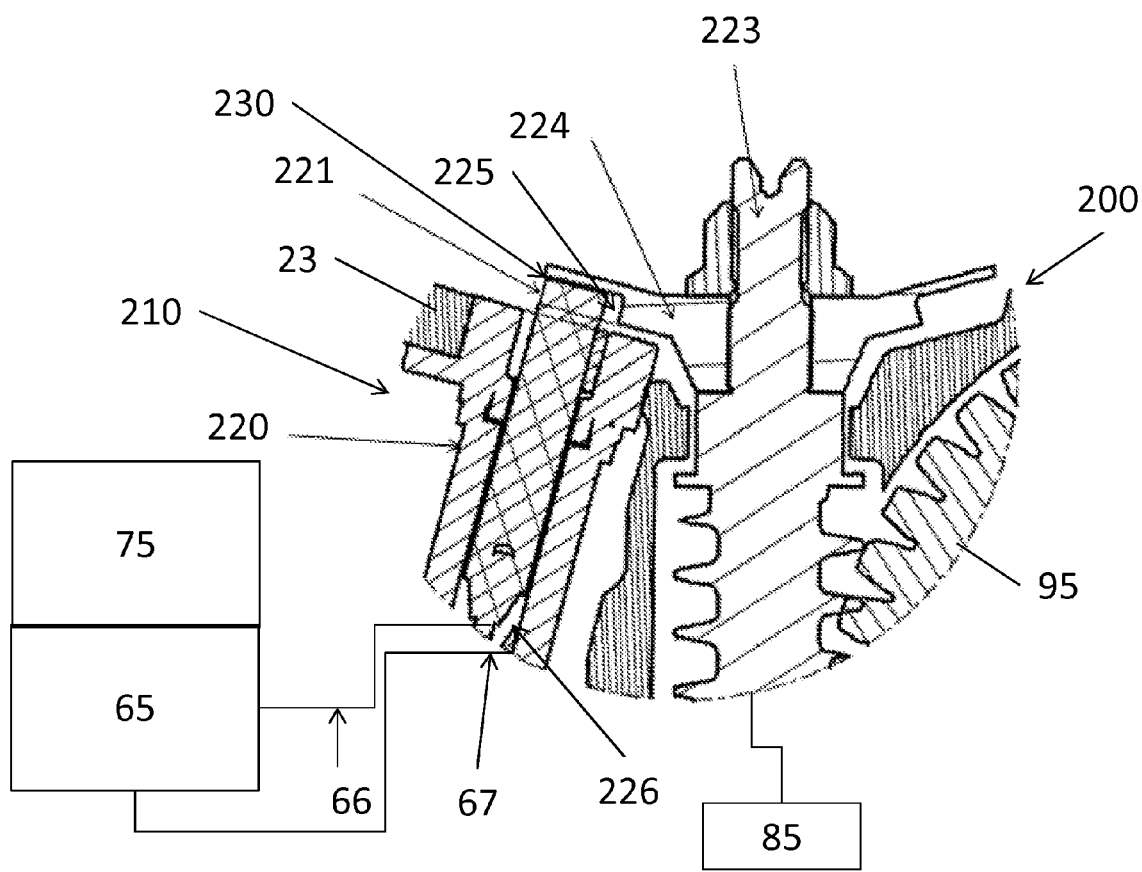
FIG. 3 is a partial graphic view of the AFS lock and solenoid components of the AFS system of the vehicle of FIG. 1.

In an exemplary embodiment of the present disclosure, the active front steering system 200 may also include an electronic control unit 65 (ECU) that may be dedicated to controlling the AFS system 200. In an alternate exemplary embodiment of the present disclosure, the AFS system 200 may include an engine control module 75 (or other control module of the vehicle) that may include the ECU 65 or may alternatively provide the function of the ECU 65 such that it is unitary with the engine control module 75, as best shown in FIG. 3. In an exemplary embodiment of the present disclosure, the active front steering system 200 may also include a motor 85 coupled to rotate a gear 95 for providing the AFS system 200 input to the steering column 22.

The AFS system 200 may include a locking unit solenoid 210 for locking the AFS system upon shutdown of the vehicle 1. In one exemplary embodiment, the AFS system 200 may include a solenoid 220 attached to a steering wheel armature 23. For locking the AFS system 200, a pin 221 has an end extending from the armature 23 and aligned with a locking disc 224 of the system 200, which disc is operated by rotation by a motor shaft 223 operated by the motor 85. The pin 221 is biased toward the locked position (as best shown in FIG. 3) by a spring 226 constantly biases the pin 221 so the end of the pin 221 is located in a recess of pocket 225 of the disc 224.

The AFS system 200 includes a locking solenoid 210 including a solenoid coil 220 for controlling the location of the pin 221 against the force of the spring 226 using a pulse width modulation (PWM) signal 66 generated by the ECU 65 of the AFS system 200.

In one exemplary embodiment of the present disclosure, the AFS system 200 may include a current sensor 67 for monitoring the current of the solenoid coil 220 of the solenoid 210. The current sensor 67 produces a signal that is connected to the ECU 65 (or alternatively the module 75) that provides effective feedback to the ECU 65 for determining movement of the pin 221 during a shutdown of the AFS system 200, such as during shutdown of the vehicle 1.

During normal AFS operation, the pin 221 may be retracted into the locking solenoid 210 when the ECU 65 of the AFS system 200 supplies the PWM signal 66 to the solenoid coil 220 which may use supplied power (not shown) to generate a magnetic force that overcomes the spring force of the spring 226 acting on the pin 221 and locating the end of the pin 221 in the recess 225.

In one exemplary embodiment of the present disclosure, the AFS system 200 may include a PWM signal 66 having a duty cycle between 0 and 1 where a 0 duty cycle has no current and a duty cycle of 1 has means the PWM current signal 66 is always on to the solenoid coil 220. To unlock the AFS system 200, the ECU controller 65 (or alternatively the ECM 75) adjusts the PWM signal 66 to have a duty cycle of 1 applied to the solenoid coil 220 for approximately between 300 and 500 milliseconds to insure the pin 221 is fully retracted from the recess 225 of the locking disc 224. After the AFS system 200 is unlocked, to maintain the pin 221 retracted in the locking solenoid 210 and the AFS system 200 in an unlocked state, the ECU controller 65 adjusts the PWM signal 66 to have a duty cycle of approximately 0.4 (+/−0.1) while the vehicle 1 is operational (i.e., the engine of the vehicle 1 is not shut down), which particular duty cycle may vary depending upon the particular specifications of the solenoid 210. As should be understood, the above is accomplished using a current control loop (meaning the current applied to the solenoid coil 220 is controlled by adjusting the PWM signal 66 accordingly), as the PWM signal 66 needed to maintain the pin 221 in an unlocked position may change with variations in temperature. It should be understood that the above duty cycle numbers are specific for a given solenoid 210, including its associated voltage (not shown), although the numbers give (from a shape point of view) a good general approximation for other solenoids as well.

Figure 4:
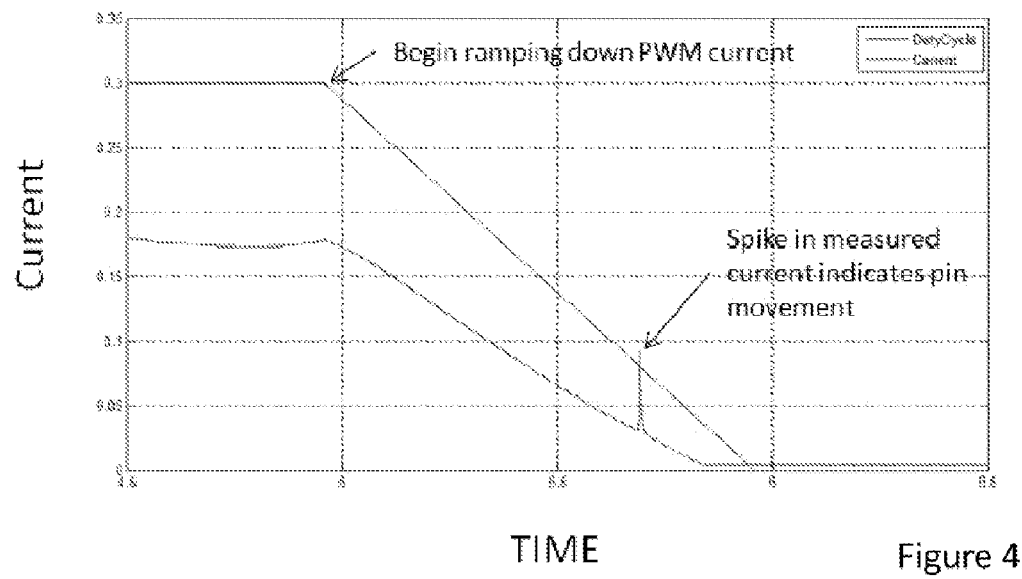
FIG. 4 is a graph of the known current control duty cycle versus time and the measured current versus time during shutdown according to the AFS system of the vehicle of FIG. 1.

Referring in particular to FIG. 4, it may be observed on the graph, that upon shutdown of the vehicle 1, the ECU 65 begins ramping down the PWM current signal or duty cycle 66 being supplied to the solenoid coil 220 toward zero and thereby reduces the magnetic force biasing the pin 221 in the unlocked position against the spring force of the spring 226. When this occurs, when the magnetic force of the solenoid coil 220 is sufficiently reduced to substantially match the biasing force of the spring 226, the pin 221 will accelerate and begin to move under the biasing force of the spring 226 from the open position and toward the closed or locked position. When the end of the pin 221 is in the recess or pocket 225 of the locking disc 224, the AFS system 200 is mechanically locked as best shown in FIG. 3.

Figure 5:
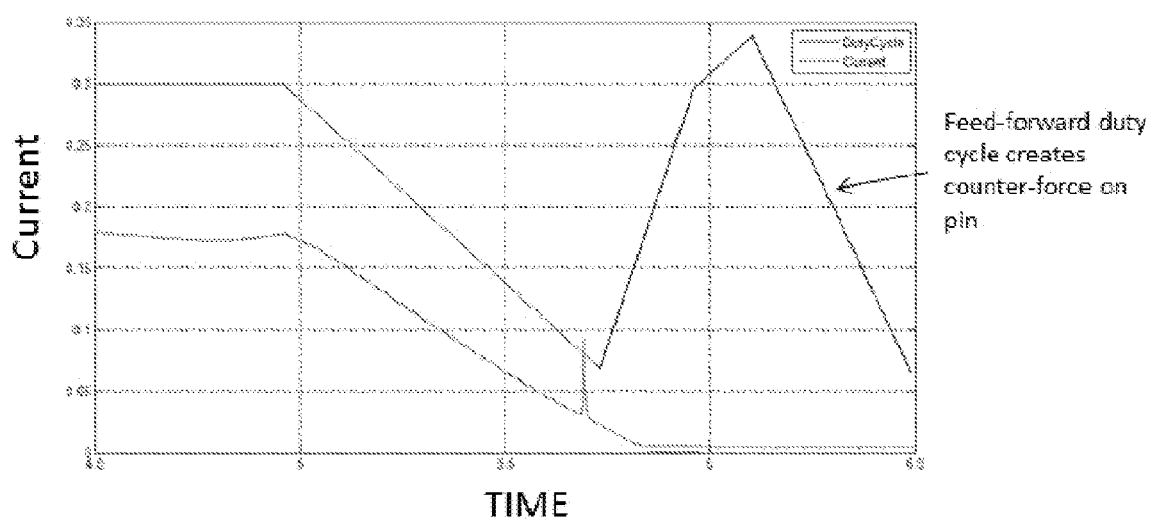
FIG. 5 is a graph of the current control duty cycle versus time and the measured current versus time during shutdown to the AFS system of the vehicle of FIG. 1.

In one exemplary embodiment of the present disclosure, the AFS system 200 is controlled using the ECU 65 to ramp down the PWM duty cycle at a rate of approximately fifty percent (50%) or instead of immediately shutting off the PWM signal as best shown in FIG. 4. As the PWM current signal 66 to the solenoid coil 220 is ramped down, the current sensor 67 is used to monitor the current in the locking system solenoid 210 and provides the detected current information to the ECU 65 to identify the point in time when the pin 221 begins to move from the open position and toward the closed position. The movement of the pin 221 may be seen as a short "spike" in the measured current detected by the current sensor 67 as best shown in the charts of FIGS. 4 and 5. The current spike is created by the movement of the pin 221 through the magnetic field of the solenoid coil 220 under the biasing force of the spring 226.

In one exemplary embodiment of the present disclosure, upon the sensing of the movement of the pin 221 as represented by the spike in the detected current from the current sensor 67, the PWM current signal 66 is immediately increased to increase the PWM duty cycle back toward 1, and to increase the current supplied to the solenoid coil 220, at a rate of between approximately sixty-six percent (66%) and eighty percent (80%) for a period of approximately one hundred (100) milliseconds, to temporarily generate an additional magnetic counter force in the solenoid coil 220 of the locking solenoid 210 of the AFS system 200 to cause the locking pin 221 to decelerate before the end of the pin 221 lands in the recess 225 of the locking disc 224 thereby reducing, if not eliminating, the noise typically associated with the end of the metal pin 221 contacting the metal locking disc 224. It should be appreciated that it is possible to use a lookup table for defining the various PWM signal 66 settings mentioned herein for operating the locking solenoid 210 to obtain the quiet function features of the present invention. It should be further appreciated that the lookup table settings may be adjusted using the current sensor 67 feedback until the locking solenoid 210 is correctly decelerated to obtain the quiet function features of the present invention.

In one alternate exemplary embodiment of the present disclosure, in addition to the improved AFS locking system 200 and its improved locking unit 210, a sound-deadening or insulating material 230 (as shown in FIG. 3), such as a rubberized coating, may be incorporated or applied on any or all of the recess 225, the locking disc 224 and/or the end of the pin 221 to further reduce the noise of the locking unit of the AFS system 200.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.00011, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless expressly stated, all ranges are intended to include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The use of the term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

The disclosure of "a" or "one" to describe an element, ingredient, component or step is not intended to foreclose additional elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps.

It is understood that the present description is intended to be illustrative and not restrictive. Many embodiments as well as many applications besides the examples provided will be apparent to those of skill in the art upon understanding the present disclosure. The scope of the claimed invention should, therefore, not be determined with limiting reference to the description, but should instead be determined with reference to the appended claims, along with the full scope of equivalents to which the claims are entitled. Any disclosure of an article or reference, including patent applications and publications, is incorporated by reference herein for all purposes. Any omission in the following claims of any aspect of subject matter disclosed herein is not a disclaimer of such subject matter.

We claim:

1. A vehicle, comprising:
   a. a steering wheel for driving the vehicle;
   b. a steering column including a steering gear input shaft, the steering column for receiving an input from the steering wheel and transferring the input to the steering wheels of the vehicle;
   c. an active front steer system for adding and subtracting angle between the steering wheel and the steering gear input shaft, the active front steer system comprising:
      i. a solenoid including a pin, a solenoid coil surrounding at least a portion of the pin for electromagnetically controlling the position of the pin; a spring for biasing the pin in a first direction;
      ii. a locking disc including a recess for receiving the pin for locking the active front steer system;
      iii. a control unit for supplying a controllable pulse-width modulated current to the solenoid coil of the solenoid; and
      iv. a current sensor for detecting the current in the solenoid coil during vehicle shutdown, the current sensor detecting the movement of the pin of the solenoid when the control unit reduces the pulse-width modulated current being supplied to the solenoid coil when the vehicle is shut down; and
   d. wherein after the control unit receives the signal indicating the movement of the pin during shut down of the vehicle, the control unit increases the pulse-width modulated current to the solenoid coil of the solenoid for the purpose of reducing the noise resulting from the pin contacting the locking disc.

2. The vehicle of claim 1 wherein the end of the pin includes an insulating material.

3. The vehicle of claim 1 wherein the recess of the locking disc includes an insulating material.

4. An active front steering system, comprising:
   a. an active front steer system for adding and subtracting angle between a steering wheel and a steering gear input shaft for a vehicle, the active front steer system comprising:
      i. a solenoid including a pin, a solenoid coil surrounding at least a portion of the pin for electromagnetically controlling the position of the pin; a spring for biasing the pin in a first direction;
      ii. a locking disc including a recess for receiving the pin for locking the active front steer system;
      iii. a control unit for supplying a controllable pulse-width modulated current to the solenoid coil of the solenoid; and
      iv. a current sensor for detecting the current in the solenoid coil during vehicle shutdown, the current sensor detecting the movement of the pin of the solenoid when the control unit reduces the pulse-width modulated current being supplied to the solenoid coil when the vehicle is shut down; and
   b. wherein after the control unit receives the signal indicating the movement of the pin during shut down of the vehicle, the control unit increases the pulse-width modulated current to the solenoid coil of the solenoid for the purpose of reducing the noise resulting from the pin contacting the locking disc.

5. The active front steer system of claim 4 wherein the end of the pin includes an insulating material.

6. The active front steer system of claim 4 wherein the recess of the locking disc includes an insulating material.

\* \* \* \* \*